United States Patent [19]
Andress et al.

[11] Patent Number: 5,421,307
[45] Date of Patent: Jun. 6, 1995

[54] ARRANGEMENT FOR CONTROLLING THE TEMPERATURE OF THE INTAKE AIR OF INTERNAL-COMBUSTION ENGINES

[75] Inventors: Heinz Andress, Erdmannhausen; Arthur Klotz; Heinz Müller, both of Remseck; Herbert Seidl, Asperg, all of Germany

[73] Assignee: Filterwerk Mann & Hummel GmbH, Ludwigsburg, Germany

[21] Appl. No.: 124,409

[22] Filed: Sep. 22, 1993

[30] Foreign Application Priority Data

Sep. 22, 1992 [DE] Germany .................... 9212739 U

[51] Int. Cl.⁶ .......................................... F02M 31/00
[52] U.S. Cl. .................................. 123/556; 29/888.01
[58] Field of Search ................... 123/556, 552; 236/13; 29/888.01

[56] References Cited

U.S. PATENT DOCUMENTS

| | | | |
|---|---|---|---|
| 4,112,896 | 9/1978 | Akado et al. | 123/556 |
| 4,161,930 | 7/1979 | Bendig et al. | 123/556 |
| 4,175,524 | 11/1979 | Coddington | 123/556 |
| 4,231,343 | 11/1980 | Alf et al. | 123/556 |
| 4,244,343 | 1/1981 | Yamaguchi et al. | 123/556 |
| 4,249,500 | 2/1981 | Behrendt et al. | 123/556 |
| 4,273,564 | 6/1981 | Sugie et al. | 123/556 |

FOREIGN PATENT DOCUMENTS

| | | |
|---|---|---|
| 2453982 | 11/1980 | France . |
| 2453982 | 11/1980 | France . |
| 2624210C2 | 4/1978 | Germany . |
| 2001387 | 1/1979 | United Kingdom . |
| 2084250 | 4/1982 | United Kingdom . |

Primary Examiner—Andrew M. Dolinar
Assistant Examiner—M. Macy
Attorney, Agent, or Firm—Evenson, McKeown, Edwards & Lenahan

[57] ABSTRACT

An arrangement for controlling the temperature of the intake air of internal-combustion engines has an intake air filter in which a swivellable control valve is provided that interacts with a pneumatic actuator. The actuator causes an adjustment of the control valve by a bimetallic control device, as a function of the air temperature fed to the internal-combustion engine. A thermostat is provided which, by way of a movable stop, determines the swivel range of the control valve in the direction that closes off the warm-air duct. The thermostat is arranged in a receiving device. This receiving device is fastened in a cold-air duct by a welded connection.

7 Claims, 4 Drawing Sheets

ARRANGEMENT FOR CONTROLLING THE TEMPERATURE OF THE INTAKE AIR OF INTERNAL-COMBUSTION ENGINES

BACKGROUND OF THE INVENTION

The present invention relates to an arrangement for controlling temperature of intake air of an internal-combustion engine, comprising an intake air filter having an untreated-air connection piece, a cold-air duct and a hot-air duct, a control valve swivellably arranged in the untreated-air connection piece, a pneumatic actuator operatively coupled to the control valve to adjust the control valve as a function of the temperature of air fed to the internal-combustion engine, and a thermostat subjected to cold air, the thermostat being coupled to a movable stop that determines a swivel range of the control valve in a direction which closes off the warm-air duct.

An arrangement of the above-mentioned type is known from German Patent Document DE-PS 26 24 210. This arrangement has the purpose of maintaining the temperature of the intake air within a defined range and comprises a pneumatic actuator which is controlled by a temperature sensor in the form of a bimetallic element.

When the main throttle valve is opened, as in the case of full-load operating conditions, an internal-combustion engine must take in colder air so that a better filling ratio and a higher performance can be achieved. However, the disadvantage exists here that during a full-load, irrespective of the existing temperatures, only cold air is taken in. In particular, at a temperature which is slightly above the freezing point, the intake branch may freeze up which results in a considerable power reduction of the internal-combustion engine. In order to prevent this, a thermostat is provided which is subjected to cold air and which determines the swivel range of the control valve in the direction which closes off the warm-air duct. This means that, even in the case of a full load, particularly in the critical temperature range, the cold air is mixed at least with a small amount of warm air.

It is a disadvantage of the known arrangement that the thermostat must be adjusted in a high-expenditure manner in order to achieve an optimal characteristic control curve.

SUMMARY OF THE INVENTION

An object of the invention is to provide an arrangement for controlling the temperature of the intake air of internal-combustion engines in which the adjusting of the thermostat can be carried out in a simple and reliable manner.

This and other objects are achieved by the present invention which provides an arrangement for controlling the temperature of the intake air of an internal-combustion engine, and comprises an intake air filter having an untreated-air connection piece, a cold-air duct and a hot-air duct, a control valve swivellably arranged in the untreated-air connection piece, and a pneumatic actuator operatively coupled to the control valve to adjust the control valve as a function of the temperature of air fed to the internal-combustion engine. A receiving device is fastened in the cold-air duct by a welded connection. A thermostat is arranged in the receiving device and is subjected to cold air. The thermostat is coupled to a movable stop that determines a swivel range of the control valve in a direction which closes off the warm-air duct.

Because of the welding of the receiving device, the manufacturing of the control box which contains the arrangement for controlling the temperature of the intake air is significantly simplified. This control box may be a simple injection-molded part, in which case the high-expenditure holding device for the thermostat is eliminated and only suitable welding surfaces must be provided. Naturally, instead of a welded connection, a different type of connection may be selected, for example, gluing, riveting, screwing or the like. It is important that the thermostat, together with the receiving device, is inserted into the injection-molded part after the manufacturing of the injection-molded part.

Another advantage of the present invention is the fact that all subsequent adjusting expenditures are eliminated. In addition, suitable adjusting devices, such as screws, sliding surfaces or sliding bearings are no longer necessary. Thus, considerable mounting costs and manufacturing expenses may be saved.

A welding device which is suitable for integrating the adjusting operations into the welding process has a relatively simple construction. For this purpose, only a longitudinally slidable welding holder is to be provided which can bring the receiving device together with the thermostat into the defined position.

It is another advantage of the invention that, in the manner of a modular design system, the control box may be equipped with different thermostats, depending on the type of internal-combustion engine for which it is used.

According to an advantageous further development of the invention, the receiving device is fixed in the cold-air pipe by ultrasonic welding or friction welding. Specifically this welding process was found to be advantageous for plastic parts which are arranged at the periphery of an internal-combustion engine.

A further development of the invention is distinguished by arrangement of the thermostat along the flow direction of the taken-in air. Thus, it is ensured that the approaching air sweeps over the whole surface of the thermostat and an optimal effect of the thermostat is achieved.

Other objects, advantages and novel features of the present invention will become apparent from the following detailed description of the invention when considered in conjunction with the accompanying drawings.

DETAILED DESCRIPTION OF THE DRAWINGS

Figure 1:
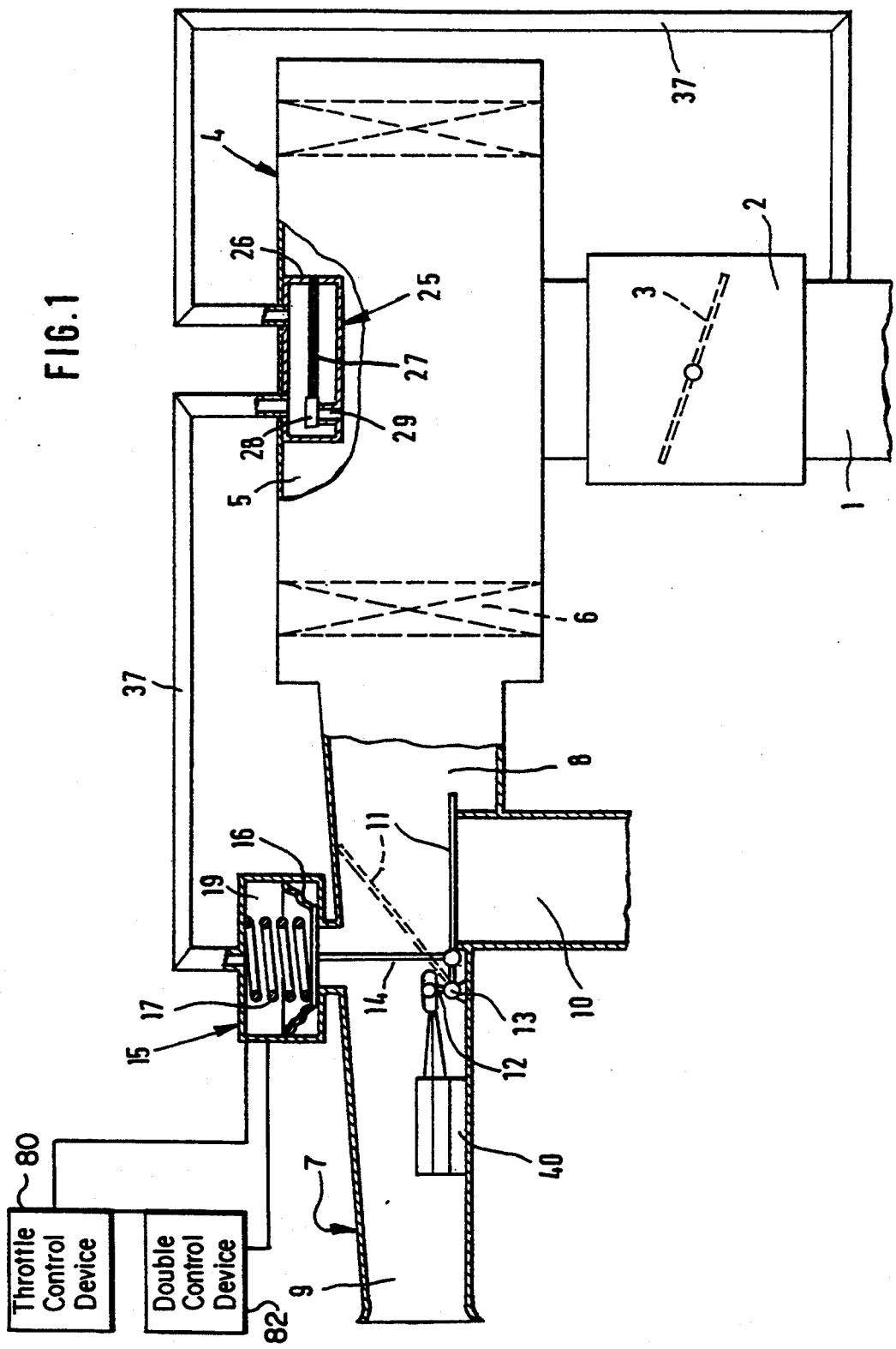
FIG. 1 is a view of an arrangement according to the present invention which includes an intake air filter that is connected to the intake duct of an internal-combustion engine and has a control device.

An internal-combustion engine, which is not shown, comprises an intake duct 1 which carries a carburetor 2 with an arbitrarily operable main throttle valve 3. An intake air filter 4 is placed on the carburetor 2, which has a ring-shaped filter insert 6 through which the flow passes radially from the outside to the inside and which encloses a pure-air space 5, and which intake air filter has an intake pipe 7. The intake pipe 7 has an untreated-air connection piece 8, a cold-air duct 9 and a warm-air duct 10 leading into the connection piece 8. By means of a warm-air pipe, which is not shown, the warm air is fed from the proximity of the exhaust pipe of the internal-combustion engine to the warm-air duct 10.

In the illustrated embodiment, the driving rod 14 of a pneumatic servo motor 15 is applied to a control valve 11 which is swivellably arranged in the untreated-air connection piece 8 and has a stop lever 12 and a swivel shaft 13. The servo motor 15 contains a rubber membrane 16 and a restoring spring 17 which penetrates a control pressure space 19. By way of a control pressure pipe 37 downstream of the main throttle valve 3 of the carburetor 2, the servo motor 15 is connected to the intake duct 1 of the internal-combustion engine. By means of the pneumatic servo motor 15, the control valve 11 can be swivelled against the force of the restoring spring 17 from its end position illustrated by a solid line, in which it closes off the warm-air duct 10 and at the same time opens up the cold-air duct 9, into its other end position illustrated by an interrupted line, in which it closes off the cold-air duct 9 and opens up the warm-air duct 10.

The servo motor 15 is connected to either double control device 82 or a throttle control device 80 is certain embodiments. This is illustrated schematically in FIG. 1. These devices 80, 82 cause the actuator to adjust the control valve as a function of the air temperature and are themselves well known to those of ordinary skill in the art.

The control pressure pipe 37 contains a ventilating valve which is constructed as a valve 25 which is actuated as a function of the temperature. In the valve housing 26, a bimetallic element 27 is fixed on the one side and, on its free end, carries a valve body 28. When the desired temperature is reached, the valve body 28 will open up a connection 29 to the pure-air space 5 of the intake air filter 4. The transmitting of the temperature from the pure-air space 5 to the bimetallic element 27 takes place by means of an opening which is not shown, which is small in comparison to the connection 29 and which, in a known manner, permits an air flow from the pure-air space 5 into the interior of the valve housing 26 which only insignificantly affects the pressure conditions.

Figure 2:
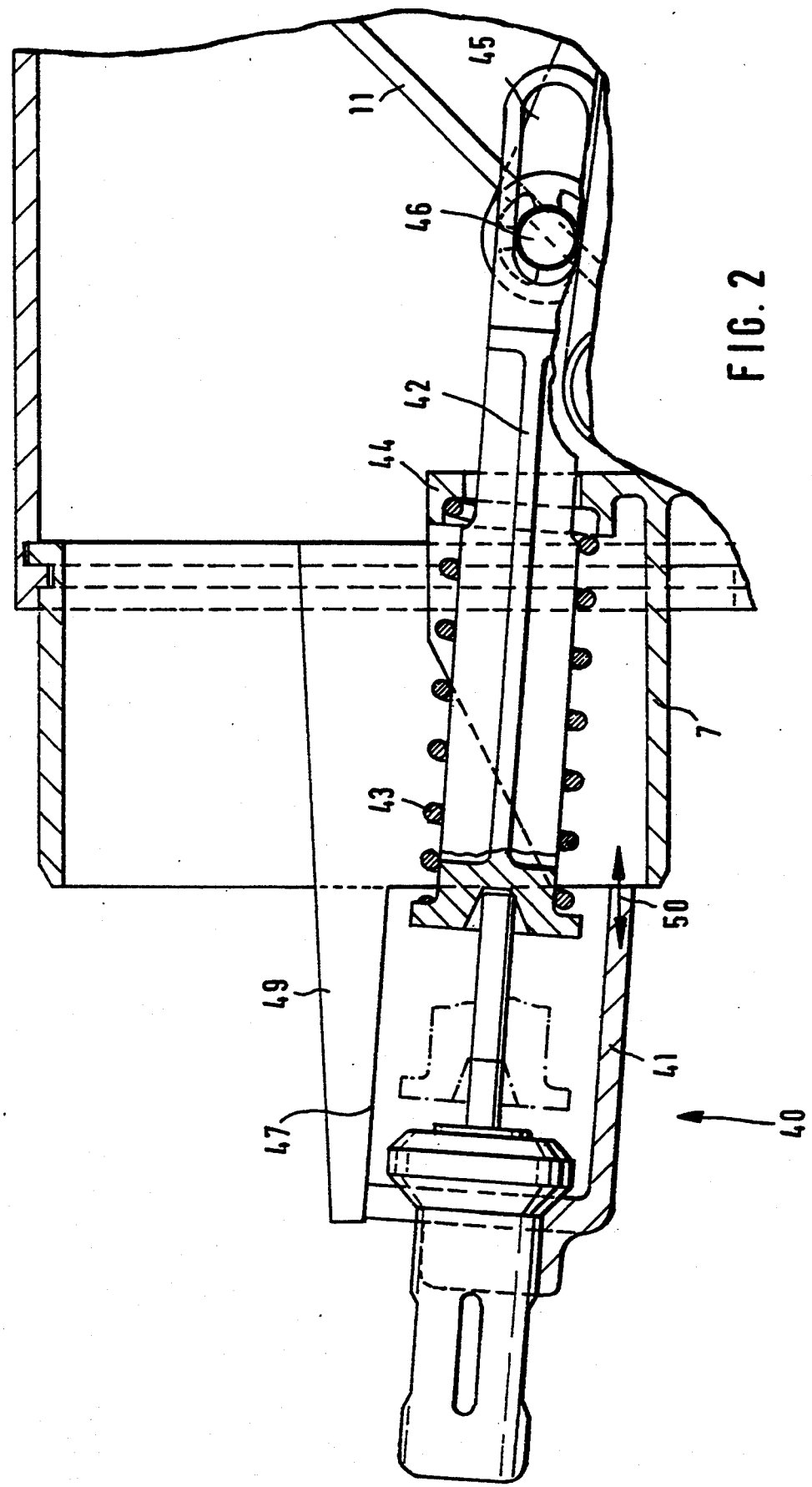
FIG. 2 is a longitudinal sectional view of a detailed representation of the thermostat.

In the cold-air duct 9, a thermostat 40, which can be a wax thermostat, for example, is arranged transversely with respect to the swivel shaft 13 and essentially along the flow direction of the taken-in air. According to FIG. 2, the thermostat 40 has a housing 41 and a driving pin 42. On one side, it is supported in the housing 41 and, on the other side, it is supported by a pressure spring 43 which rests against contact point 44 of the intake pipe 7. On the driving pin 42 of the thermostat 40, a longitudinal bore 45 is situated. A journal 46 of the control valve 11 is movably arranged in this longitudinal bore 45.

Figure 3:
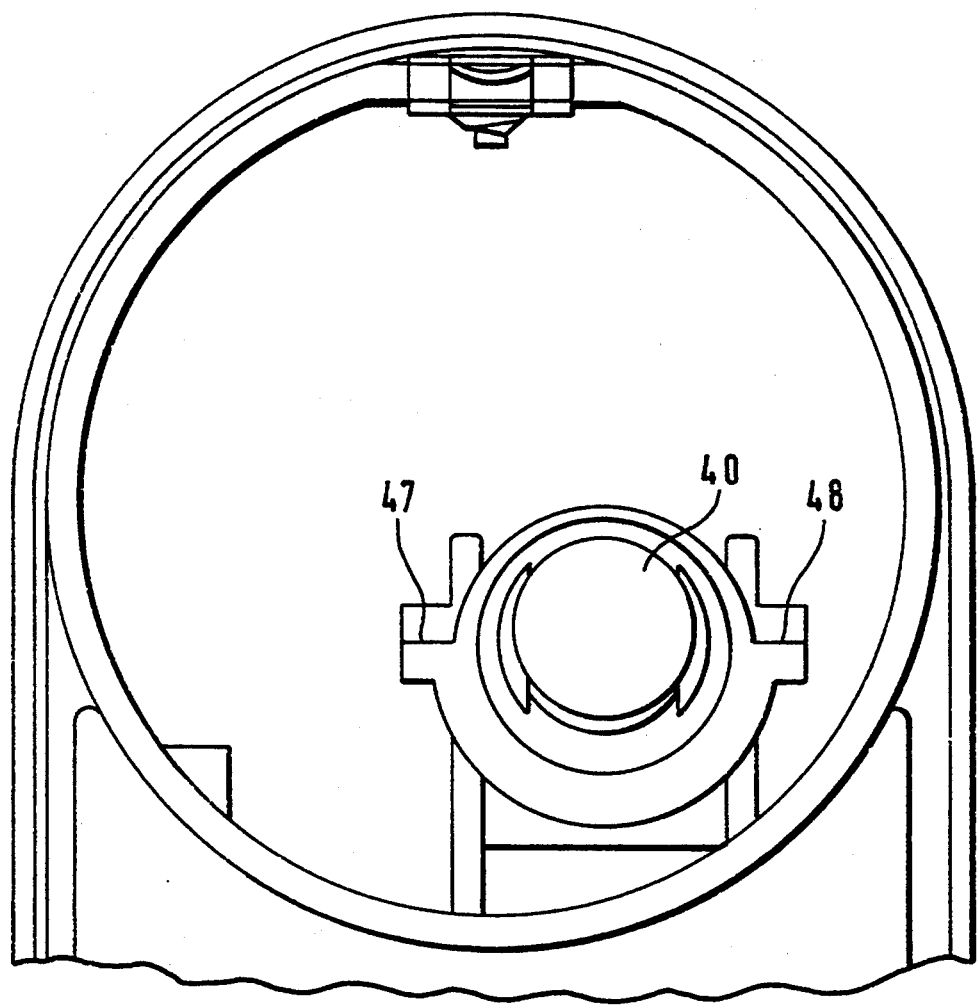
FIG. 3 is a view of the thermostat from the direction of the cold-air inlet.

On the contact surface 47, the housing 41 of the thermostat 40 is welded to a projection 49 of the intake pipe 7. FIG. 3 clearly illustrates the contact surface 47 as well as the other contact surface 48. On the intake pipe 7, the thermostat can be slid before the welding into the direction of the arrow 50 in order to define the exact position of the thermostat with respect to the control valve 11.

Figure 4:
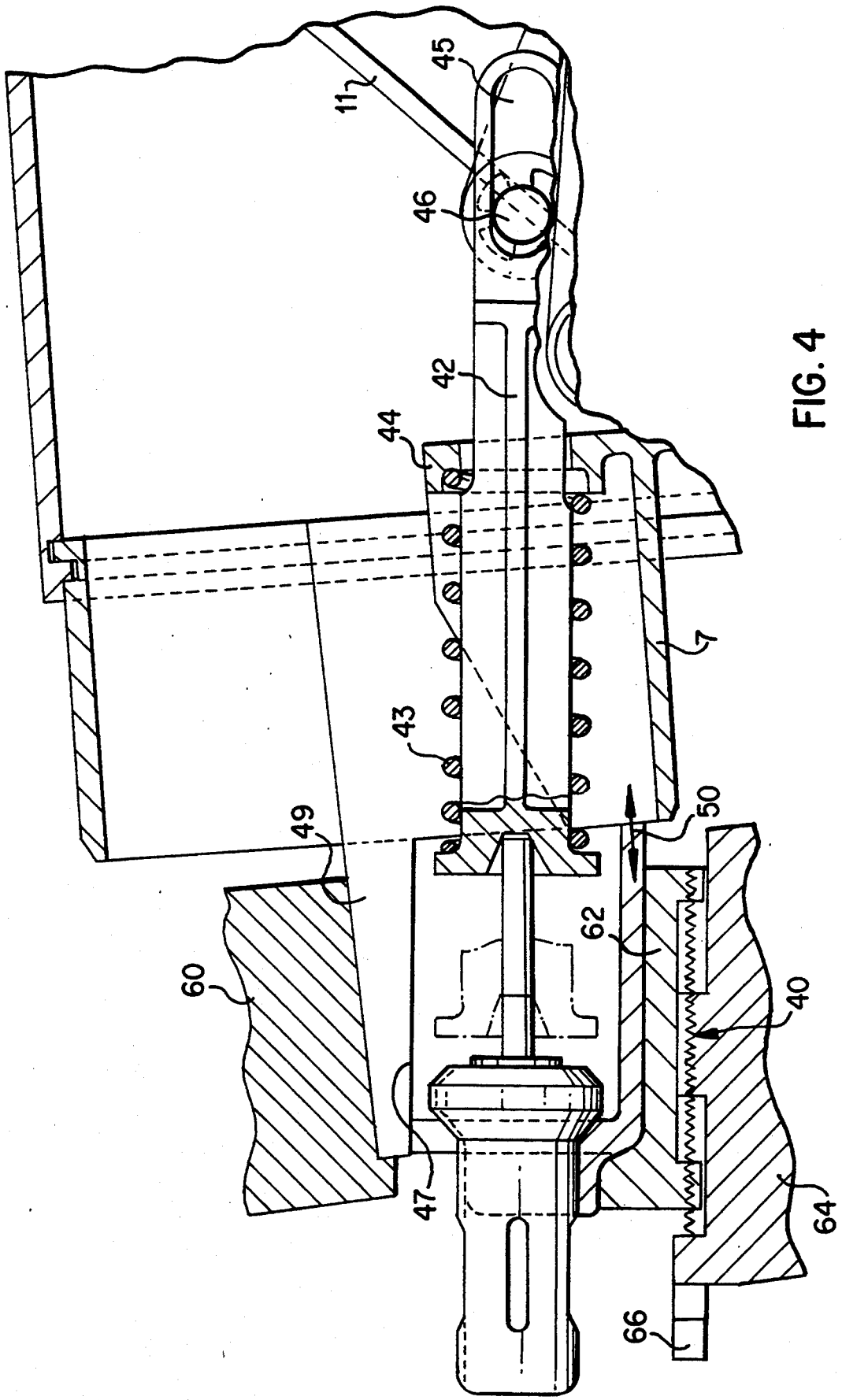
FIG. 4 shows a welding device for performing a welding according to the present invention.

A welding device for performing a welding of the receiving device according to a process of the present invention is shown in FIG. 4. The welding device includes a welding receiving device 60, a welding holder 62 that is displaceable with a threaded spindle, a stationary part 64 and a drive 66. The housing of the arrangement is fixed in the welding receiving device 60, and the receiving device 41 with the thermostat is fastened in the welding holder 62. This welding holder 62 is displaceable via the stationary part 64 and drive 66 is carried out by the welding holder 62.

The operation of the entire system is described as follows.

During the operation of the internal-combustion engine, a vacuum exists in the whole intake system and is the highest in the intake duct 1 and decreases toward the cold-air duct 9. The large vacuum of the intake duct 1 is transmitted through the control pressure pipe 37 into the control pressure space 19 of the pneumatic servo motor 15 above the rubber membrane 16. Corresponding to the vacuums existing on both sides of the rubber membrane and corresponding to the membrane surface, the vacuum exercises a force there for adjusting the control valve 11. A significant influence on the pressure conditions in the control pressure pipe 37 is also exercised by the air which, through the connection 29, may arrive in the thermostatic valve 25 and thus in the control pressure pipe 37 when the bimetallic element 27 has bent away upwards above a predetermined temperature and the valve body 28 has opened the connection 29.

When the main throttle valve is closed, for example, during the idling operation, the vacuum in the intake duct 1 is particularly large. When then, at a correspondingly low temperature of the taken-in air, the connection 29 is closed, the high vacuum which occurs in the pneumatic servo motor 15 above the rubber membrane 16 can swivel the control valve 11 against the force of the restoring spring 17 into the position which is illustrated by an interrupted line and in which it has closed the cold-air duct 9 and has opened up the warm-air duct 10.

When the temperature of the air, which enters through the warm-air duct 10 into the untreated-air connection piece 8 and, after passing through the filter insert 6, arrives in the pure-air space 5 and thus influences the thermostatic valve 25, exceeds a predetermined value, the bimetallic element 27 will start to curve upwards. The valve body 28 opens up the connection 29 to the pure-air space 5, and, in addition, pure air can penetrate into the control pressure pipe 37 and reduce the vacuum there. As a result, the control valve 11 will continue to swivel away from its end position closing the cold air duct 9 until the mixed air has the temperature at which an equilibrium condition occurs between the force of the restoring spring 17, on the one hand, and the forces occurring at the rubber membrane 16 of the pneumatic servo motor 15 as well as on the control valve 11, on the other hand.

As the opening of the main throttle valve 3 of the carburetor 2 increases, the vacuum in the intake duct 1 will decrease. When the main throttle valve 3 is completely open, the vacuum in the intake duct 1 and thus in the control pressure space 19 of the pneumatic servo motor 15 is so low that it will no longer be sufficient for overcoming the force of the restoring spring 17. Above a predetermined temperature of the air flowing in through the cold-air duct 9, the warm-air duct 10 will then definitely be closed, and the internal-combustion engine will receive air only through the cold-air duct 9. The lower temperature of the intake air resulting from the closing-off of the warm-air duct 10 leads to a better filling ratio of the engine so that a better performance is achieved particularly in the full-load operation.

However, when the air taken in through the cold-air duct 9 falls below the predetermined temperature, the driving pin 42 of the thermostat is displaced so far in the direction of the thermostat that the control valve 11 partially opens up the warm-air duct 10 so that some warm air is admixed in order to achieve a temperature of a mixed air which does not fall below a desired value and reliably prevents, for example, any icing in the intake system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for controlling the temperature of the intake air of an internal combustion engine, comprising:
    an intake air filter having an untreated-air connection piece;
    a cold-air duct and a hot-air duct;
    a control valve swivellably arranged in the untreated-air connection piece;
    a pneumatic actuator operatively coupled to the control valve to adjust the control valve as a function of the temperature of air fed to the internal combustion engine;
    a receiving device fastened in the cold-air duct by a welded connection and having a contact surface; and
    a thermostat arranged on the contact surface of the receiving device so as to be initially slideable and adjustable into a specified position and subsequently fixed on the contact surface and subjected to cold air, the thermostat coupled to a movable stop that determines a swivel range of the control valve in a direction which closes off the warm-air duct.

2. An arrangement according to claim 1, wherein the receiving device is displaceable along a longitudinal axis of the cold-air duct to adjust the thermostat with respect to the position of the control valve before welding of the receiving device.

3. An arrangement according to claim 2, wherein the receiving device is fastened in the cold-air duct by at least one of ultrasonic welding and friction welding.

4. An arrangement according to claim 1, wherein the thermostat extends along a flow direction of the intake air.

5. An arrangement according to claim 1, further comprising at least one of a double control device and a throttle control device that causes the actuator to adjust the control valve as a function of the fed air temperature.

6. A process for welding a receiving device in a duct of an arrangement for controlling the temperature of the intake air of an internal-combustion engine, comprising:
    fixing a housing of the arrangement in a welding receiving device;
    fastening the receiving device in a welding holder, the receiving device having a thermostat that is displaceable with respect to a swivel point of a control valve; and
    adjusting a position of the receiving device in the duct by sliding it along a contact surface of the duct into a specified position and subsequently welding the receiving device in the duct.

7. An arrangement according to claim 1, wherein the actuator is a pneumatic actuator.

* * * * *